(12) United States Patent
Domen et al.

(10) Patent No.: US 12,110,936 B2
(45) Date of Patent: Oct. 8, 2024

(54) SILICONE FREE ROTATIONAL SPRING HINGE DAMPENER

(71) Applicant: ILLINOIS TOOL WORKS INC., Glenview, IL (US)

(72) Inventors: Craig Martin Domen, Lowell, MI (US); Daniel Lindsey, Tinley Park, IL (US); Steve Bivens, Kankakee, IL (US); Samuel Smith, Allendale, MI (US)

(73) Assignee: Illinois Tool Works Inc., Glenview, IL (US)

( * ) Notice: Subject to any disclaimer, the term of this patent is extended or adjusted under 35 U.S.C. 154(b) by 210 days.

(21) Appl. No.: 17/399,825

(22) Filed: Aug. 11, 2021

(65) Prior Publication Data

US 2022/0056979 A1    Feb. 24, 2022

Related U.S. Application Data

(60) Provisional application No. 63/067,231, filed on Aug. 18, 2020.

(51) Int. Cl.
| | |
|---|---|
| *F16F 13/04* | (2006.01) |
| *C08G 63/66* | (2006.01) |
| *C08J 3/28* | (2006.01) |

(52) U.S. Cl.
CPC ............. *F16F 13/04* (2013.01); *C08G 63/66* (2013.01); *C08J 3/28* (2013.01); *F16F 2222/04* (2013.01); *F16F 2224/02* (2013.01); *F16F 2224/025* (2013.01); *F16F 2232/02* (2013.01); *F16F 2236/08* (2013.01)

(58) Field of Classification Search
CPC .... F16F 13/04; F16F 2222/04; F16F 2222/02; F16F 2224/025; F16F 2232/02; F16F 2236/08; C08G 63/66; C08J 3/28
USPC .................................................. 267/279, 154
See application file for complete search history.

(56) References Cited

U.S. PATENT DOCUMENTS

| | | | | |
|---|---|---|---|---|
| 431,124 | A * | 7/1890 | Rae ........................... | F16D 3/72 464/59 |
| 2,407,757 | A * | 9/1946 | Maccallum ............ | F16D 27/112 192/89.25 |
| 4,323,994 | A * | 4/1982 | Coogler ................. | G01V 1/181 367/187 |
| 5,209,461 | A * | 5/1993 | Whightsil, Sr. ..... | A63B 21/0455 267/155 |
| 5,547,174 | A * | 8/1996 | Bade ...................... | F16C 27/066 267/281 |
| 6,440,044 | B1 * | 8/2002 | Francis .............. | A63B 21/4043 482/137 |

(Continued)

FOREIGN PATENT DOCUMENTS

| | | |
|---|---|---|
| EP | 0245203 A2 | 11/1987 |
| JP | 6828873 B2 | 2/2021 |

*Primary Examiner* — Xuan Lan Nguyen
(74) *Attorney, Agent, or Firm* — Quarles & Brady LLP

(57) ABSTRACT

The present disclosure provides a rotational spring dampener that has a compression limiter, a first disk, and a second disk. The first disk is disposed at a first end of the compression limiter and the second disk is disposed at a second end of the compression limiter, where the second end is opposite the first end. The rotational spring dampener also has a tensile member. The tensile member is connected to the first disk and the second disk. The tensile member is composed of a block copolymer.

10 Claims, 9 Drawing Sheets

(56) References Cited

U.S. PATENT DOCUMENTS

| | | | | |
|---|---|---|---|---|
| 8,176,809 | B2* | 5/2012 | Ihrke | B25J 17/0241 |
| | | | | 267/161 |
| 9,079,672 | B2* | 7/2015 | Baudasse | B64G 1/222 |
| 9,234,554 | B2* | 1/2016 | Dadd | F16F 1/10 |
| 10,343,006 | B2* | 7/2019 | Francis | A63B 21/045 |
| 10,808,713 | B2* | 10/2020 | Lucchetta | F04D 29/059 |
| 2004/0026840 | A1* | 2/2004 | Eckel | F16D 3/62 |
| | | | | 267/154 |
| 2017/0343073 | A1 | 11/2017 | Muranaka | |
| 2018/0231097 | A1* | 8/2018 | Fenioux | F16F 15/1333 |
| 2018/0283488 | A1* | 10/2018 | Durham | F16F 15/1215 |

* cited by examiner

Location of Damper

SILICONE FREE ROTATIONAL SPRING HINGE DAMPENER

CROSS REFERENCE TO RELATED APPLICATIONS

This application is based on, claims priority to, and incorporates herein by reference in its entirety U.S. provisional patent application No. 63/067,231 entitled "SILICONE FREE ROTATIONAL SPRING HINGE DAMPENER," filed on Aug. 18, 2020.

BACKGROUND

Rotational springs may be used in a variety of applications. For some applications, it is desirable to combine a rotational spring with a dampener. Dampeners may reduce the release velocity of a loaded rotational spring after it is released. Some dampeners may be particularly useful in combination with specific types of rotational springs. For example, typical silicone dampeners offer only low amounts of resistance torque and may only be suitable for use with low torque rotational springs, and not for use with high torque springs. Further, certain dampeners may not be well-suited for use in all situations, for example, in extreme temperatures.

SUMMARY

The present disclosure provides a rotational spring dampener that has a compression limiter, a first disk, and a second disk. The first disk is disposed at a first end of the compression limiter and the second disk is disposed at a second end of the compression limiter, where the second end is opposite the first end. The rotational spring dampener also has a tensile member. The tensile member is connected to the first disk and the second disk. The tensile member is composed of a block copolymer.

DETAILED DESCRIPTION

The present disclosure provides a dampener that may be combined with a rotational spring in order to improve the performance of the spring. The term rotational spring is interchangeable with the term "torsion spring," as used herein. Torsion springs are often coupled with a dampener such that the spring may drive a mechanical motion in a clockwise or counterclockwise direction while being dampened to control the spring's rotational velocity and/or resonant bounce. Such springs are often metallic coil springs or clock springs.

For some applications, low mass and low-level torque requirements may be adequately supplied by metal springs. However, when metal springs are used in applications with high torque requirements, specifications often necessitate the use of heavy gage wire in order to obtain the desired torque. This increases product mass and size/volume, which is often undesired. For example, in some applications the packaging for the torsion spring and dampener must be small to maximize storage space and aesthetic targets, while performing well over time and temperature changes, as well as performing quietly. Additionally, for some applications, certain materials may not be suitable for use in a dampener. For example, in high-heat applications (such as temperatures above 140° F.) certain polymeric materials may become overly oriented, which may lead to undesirable annealing of the polymeric material. Embodiments of the present disclosure discussed herein address some of these deficiencies.

Figure 1A:
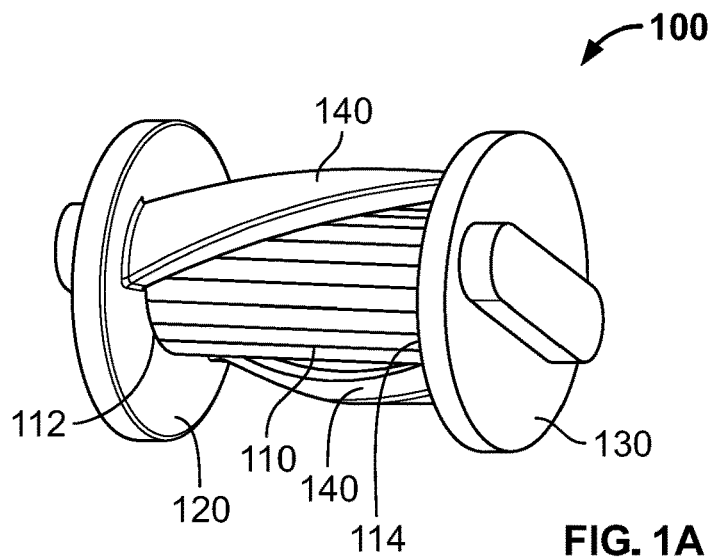
FIG. 1A shows an embodiment of a dampener in a pre-loaded home position.
Figure 1B:
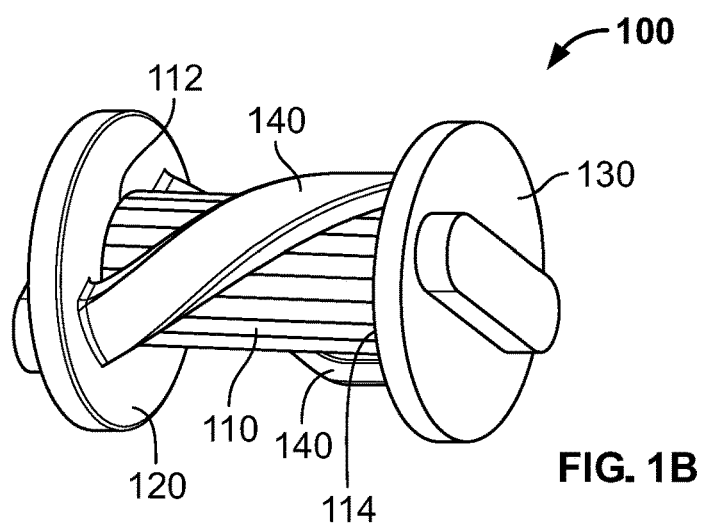
FIG. 1B shows the dampener in a 30 degree rotation applied position.
Figure 1C:
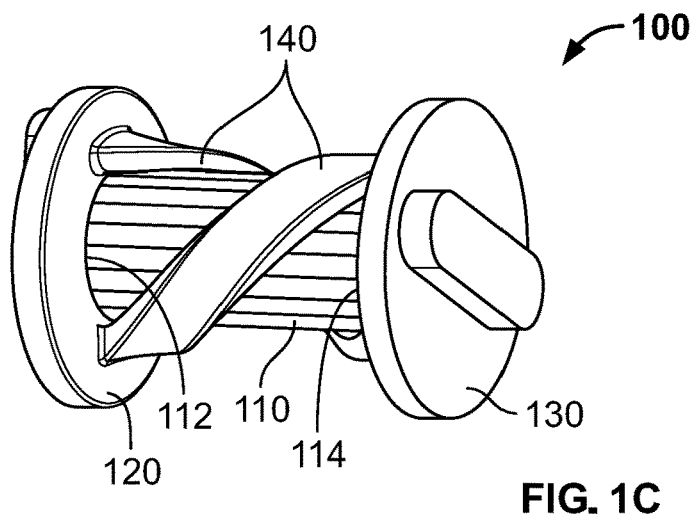
FIG. 1C shows the dampener in a 240 degree rotation applied position.
Figure 3:
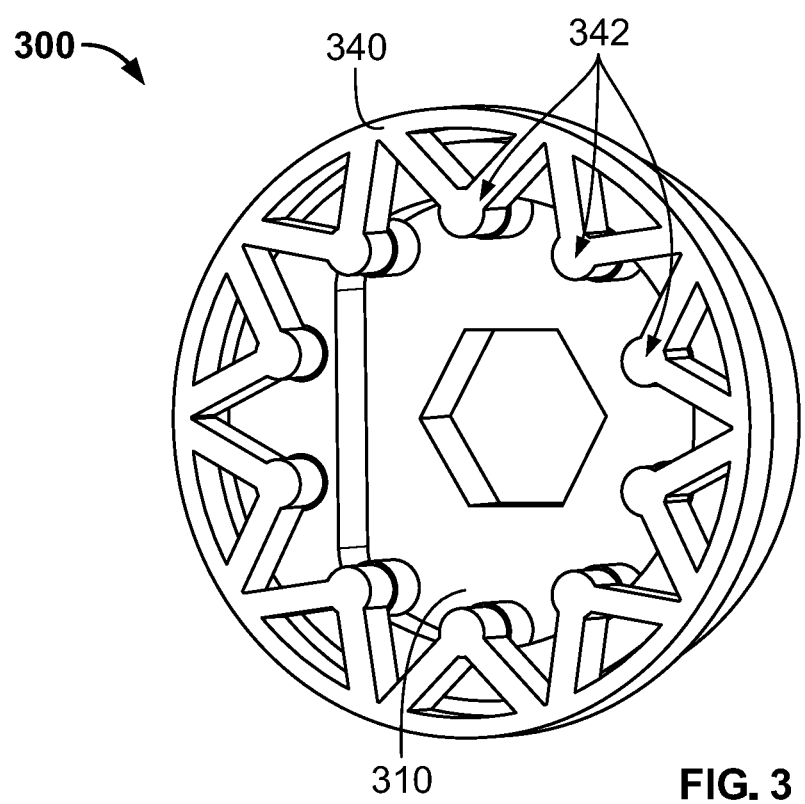
FIG. 3 shows another embodiment of a dampener connected to a rotational spring.
Figure 4:
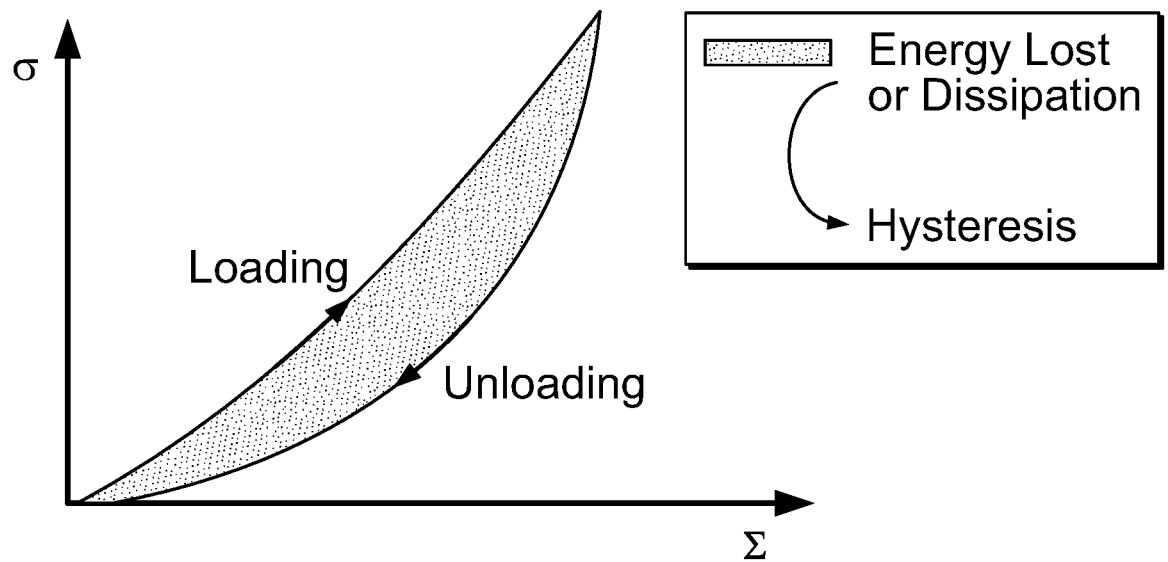
FIG. 4 is an example of a stress strain curve for a dampener similar to the dampener of FIG. 3.
Figure 5:
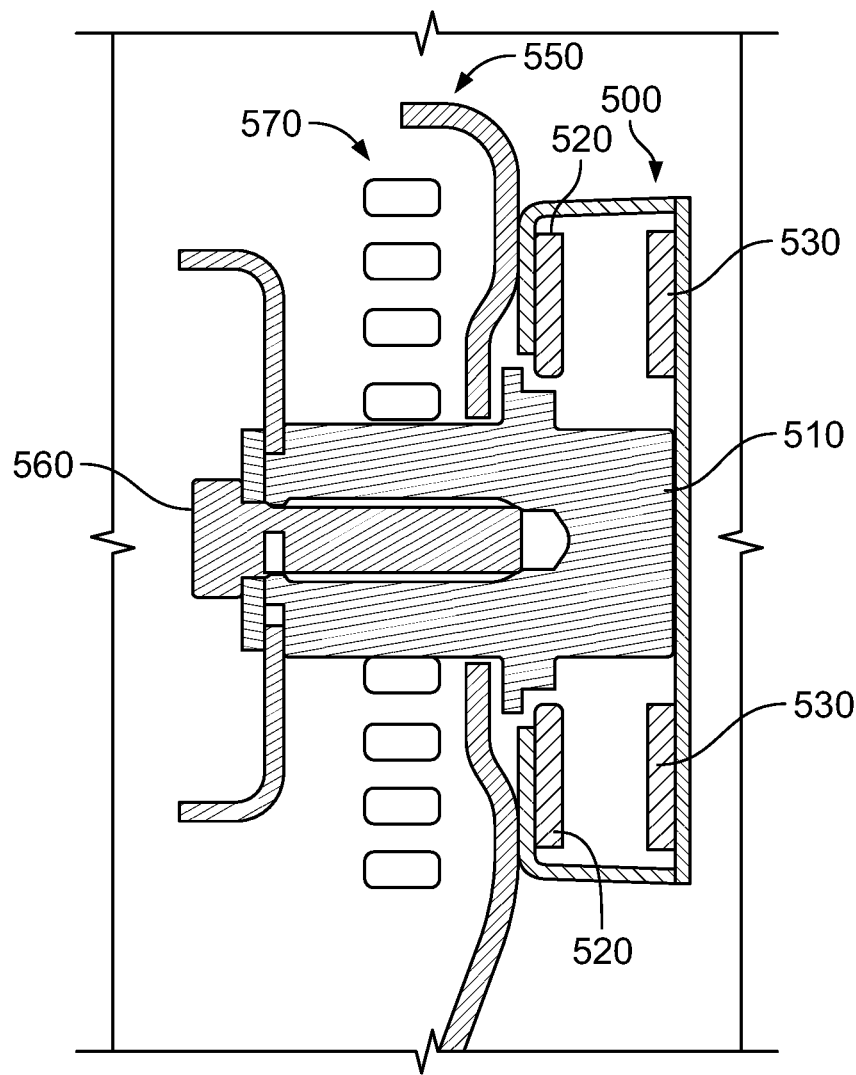
FIG. 5 a top schematic view of a different dampener that has been installed on an application.

FIGS. 1A-1C show one embodiment of a dampener. FIGS. 2A-2D show another embodiment dampener. FIGS. 3-4 show still another embodiment dampener. Further, FIGS. 5-6 show dampeners installed in applications. FIGS. 7A-7C show yet another embodiment dampener.

Turning to FIGS. 1A-1C, the dampener 100, has a compression limiter 110. The dampener 100 also has a first disk 120 that is disposed at a first end 112 of the compression limiter 110, and a second disk 130 that is disposed at a second end 114 of the compression limiter 110. The second end 114 is opposite of the first end 112, with reference to the axial length of the compression limiter 110. The dampener 100 also has a tensile member 140.

Further referencing FIGS. 1A-1C, the compression limiter 110 is positioned between the first disk 120 and the second disk 130, such that the first disk 120 and second disk 130 are prevented from contacting each other by the compression limiter 110. The compression limiter may be cylindrical in shape, as shown in FIGS. 1A-1C. However, the compression limiter may alternatively be formed in other shapes, such as a rectangular prism, hexagonal prism, or octagonal prism. The compression limiter may be elongated, such that its length in the axial direction is greater than its diameter. However, the compression limiter may alternatively have a wide-shape, such that its diameter is larger than its length in the axial direction. In one embodiment, the compression limiter may be a barrel. The compression limiter may be composed of any suitable material for separating the first disk and the second disk, in a given application. In a particular embodiment, the compression limiter is made out of a hard polymeric material, such as polyvinylchloride (PVC), high-density polyethylene (HDPE), fluoroplastics (such as Teflons), polyamides (such as Nylons, especially Nylon 6, Nylon 66, Nylon 12, Nylon 13, and Nylon 11), polyetheleneterthalate (PET), polybutelene terethalate (PBT), or polyoxymethylene (POM). A compression limiter composed of such materials may be advantageous as it will have a relatively low mass, be inexpensive to fabricate, and may also provide advantages in terms of the amount of friction generated between the compression limiter and the tensile member.

Further referencing FIGS. 1A-1C, the first disk 120 and second disk 130 may be formed in any shape suitable for the application in which they are deployed. In the embodiment shown in FIGS. 1A-1C, the first disk 120 and the second disk 130 are both circular in shape. In other embodiments, the disks may be rectangular, hexagonal, octagonal, or the like. The disks may be formed in any size suitable for the application. In the embodiment shown in FIGS. 1A-1C, both the first disk 120 and the second disk 130 have a diameter that is larger than the diameter of the axial ends of the compression limiter 110. In alternative embodiments, the disks may have a diameter that is the same size as or is smaller than the diameter of the axial ends of the compression limiter. The disks 120, 130 may be made of any suitable material. In one embodiment, the disks are both composed of a hard, polymeric material, such as polyvinylchloride (PVC), high-density polyethylene (HDPE), fluoroplastics (such as Teflons), polyamides (such as Nylons, especially Nylon 6, Nylon 66, Nylon 12, Nylon 13, and Nylon 11), polyetheleneterthalate (PET), polybutelene terethalate (PBT), or polyoxymethylene (POM). Further, it is also contemplated that the first disk 120 may be composed of a different material than the second disk 130. Still further, it is envisioned that the disks 120, 130 may be composed of the same material as the compression limiter 110. In one particular embodiment, the disks 120, 130 are both composed of the same block copolymer material (described below) as the tensile member 140.

Again referencing FIGS. 1A-1C, the tensile member 140 is connected to the first disk 120 and the second disk 130. In the embodiment shown in FIGS. 1A-1C, the dampener 100 has two tensile members 140. The dampener 100 may have three tensile members, or four tensile members, or six tensile members, or more. The tensile member may be a strap. In an embodiment, when the dampener is twisted about its axis, the tensile member exerts a compressive force on the first disk and the second disk such that the disks engage the compression limiter at the first end and the second end, respectively, and friction is generated between the axial faces of the compression limiter and the disks disposed at the ends of the compression limiter.

The tensile member 140 may be composed of a block copolymer. Preferably, the tensile member 140 may be composed of a modified block copolymer.

The term "block copolymer" as used herein refers to a polymer having large continuous sections of the polymeric strand (at least 1000 monomeric units long) that are composed primarily of a single type of monomer. A block copolymer is different than a random copolymer, in that the monomeric units are not distributed randomly along the polymeric chain, but rather are organized into blocks/sections that are composed primarily of a single type of monomeric unit. For example, a block copolymer made of monomers A and B will have large continuous sections that are composed primarily of monomer A and different large continuous sections that are composed primarily of monomer B. The blocks formed from polymerization of monomers A/B may be arranged in alternating fashion, forming block copolymers having a structure of ABA or BAB and/or in repeating fashion, forming block copolymers having structures such as AAB or BBA, or any combination thereof. Additionally, each block may contain substantially the same number of monomers as other blocks composed of the same monomer (i.e., each A block having substantially the same number of A monomers and each B block having substantially the same number of B monomers) or may contain a different number of monomers, relative to other blocks composed of the same monomer (i.e., different A blocks having different amounts of A monomers).

The term "base block copolymer" as used herein, refers to a block copolymer having a chemical composition and structure that has not been modified, and specifically has not been crosslinked following polymerization of the block copolymer and/or been exposed to treatment that would induce substantial crosslinking, notwithstanding that the block copolymer may comprise additive(s) or functionality which will cause, promote, or enable substantial crosslinking upon subjection or exposure to such treatment (e.g., upon exposure to high-energy beta ray radiation). The term "modified block copolymer" as used herein refers to a base block copolymer that has been chemically and/or structurally modified following its polymerization, specifically having been exposed to treatment that would induce substantial crosslinking. A modified block copolymer may be a base block copolymer that has been radiation crosslinked. As used herein, the term "radiation crosslinked" refers to a polymer that has been exposed to sufficient high-energy beta ray radiation (referred to as beta-minus $\beta^-$ radiation) as to induce substantial crosslinking of the block copolymer. With respect to the radiation crosslinking process, the amount radiation to which a polymer has been exposed is controlled by (and defined by) exposure time and intensity. Such radiation exposure measurements are typically performed using Becquerel metric units and a sacrificial paper test, where the sacrificial paper indicates (often via color change) the amount of radiation exposure. During a sacrificial paper test, the sacrificial paper is periodically analyzed and based on the analysis of the sacrificial paper, a decision is made to either continue exposing a polymeric component to additional radiation cycles or end the exposure process. With respect to the crosslinking process, exposure of a polymeric component to radiations is typically limited to seconds of exposure. The duration of an exposure cycle may range from about 15 seconds to about 30 seconds, per exposure. During the crosslinking process, a specific polymeric component may undergo anywhere from 1 to 30 radiation exposure cycles, depending upon the properties of the non-crosslinked itself and the intended application of the resulting crosslinked polymeric component. Overexposing the part to irradiation during any one radiation cycle can degrade the molecular structure of a polymeric component, causing poor product performance. For this reason, radiation exposure is highly controlled and any particular radiation cycle is limited to avoid permanent degradation of the polymer parts. Beneficially, radiation crosslinking improves certain mechanical and chemical properties of polymers, such as G value, yield strength, elongation, and creep resistance. Additionally, radiation crosslinking may be used to modify polymers after molding, facilitating easy/standard selection and formation of a particularly desirable base polymer, as well as easy/standard article molding processes, which may then be augmented with subsequent radiation crosslinking of the molded polymeric article.

Suitable base block copolymers for use in the tensile member 140 include thermoplastic elastomers. Particularly advantageous thermoplastic elastomers suitable for use as base block copolymers in the tensile member 140 include base block copolymers having monomeric units derived from an ester and monomeric units derived from an ether, hereafter referred to as an "ether/ester block copolymer". Some ether/ester block copolymers may consist only of monomeric units derived from an ether and monomeric units derived from an ester. For example, the ether/ester block copolymer used in the present disclosure will have large continuous sections that are composed primarily of monomeric units derived from an ester (referred to as "polyester") and different large continuous sections that are composed primarily of monomeric units derived from an ether (referred to as "polyether"). A section of the polymeric chain (i.e. a block) that is composed primarily of polyester is referred to hereafter as a "hard block." whereas a section of the polymeric chain (or block) that is composed primarily of polyether is referred to hereafter as a "soft block." Other thermoplastic elastomers suitable for use as base block copolymers include silicon-based block copolymer elastomers (i.e., block copolymers having greater than 50 weight percent of monomers derived from silicon), nylon-based block copolymer elastomers (i.e., block copolymers having greater than 50 weight percent of monomers derived from nylon or similar amides), fluoro-block copolymer elastomers (i.e., block copolymers having greater than 50 weight percent of monomers including a fluorine atom), and polyurethane block copolymer elastomers.

The ratio of hard block vs. soft block can be adjusted to promote orientation of the base block copolymer to enhance performance in properties such as yield strength, elongation, and creep resistance when the base block copolymer resin is under torsion, compression, and tensile loads. A base block copolymer resin having a greater weight percentage of soft block will have more elongation than a base block copolymer resin having a lesser weight percentage of soft block. Similarly, a base block copolymer resin having a greater weight percentage of hard block will have less elongation and a higher yield point after orientation than a base block copolymer resin having a lesser weight percentage of hard block. With reference to yield point, a base block copolymer resin having a greater weight percentage of soft block will have a lower tensile modulus than a base block copolymer resin having a lesser weight percentage of soft block. Similarly, a base block copolymer resin having a greater weight percentage of hard block will have greater tensile modulus than a base block copolymer resin having a lesser weight percentage of hard block.

Non-limiting examples of specific base block copolymers suitable for use in the tensile member 140 include Hytrel block coplymers (polyethylene terephthalate/polybutylene terephthalate hard block, polyether soft block) available from DuPont, Arnitel block copolymers (polyethylene terephthalate/polybutylene terephthalate hard block, polyether soft block) available from DSM, KEYFLEX block copolymers (polyethylene terephthalate/polybutylene terephthalate hard block, polyether soft block) available from LG Chemical, silicon-based thermoplastic block copolymers such as TPSiV® 4000-50A, TPSiV® 4000-60A, and TPSiV® 4000-75A available from DuPont, amide-based thermoplastic block copolymers (polyamide hardblock, polyether soft block) such as PEBAX available from Arkema, and fluoro-block copolymer elastomers such as Kynar available from Arkema.

Additionally, the base block copolymer can be blended with other polymeric materials and additives in order to obtain a base block copolymer resin having desired traits. Some resin compositions may include a base block copolymer mixed with an additional neat hard block polymer. For example, a base block copolymer resin may be formed by adding an additional neat polyamide polymer to an amide-based thermoplastic base block copolymer (polyamide hardblock, polyether soft block), such as PEBAX. In another example, a base ether/ester block copolymer can be melt-blended with a neat hard block polymer (such as polyethylene terephthalate (PET) resin), prior to injection molding, to increase the hard block content of the final block copolymer resin. Adding neat hard block polymer to a block copolymer can alter the hardness of the resulting resin (as compared to the hardness of the block copolymer) and/or the glass transition temperature of the resulting resin (as compared to the glass transition temperature of the block copolymer) which may beneficially reduce the orientation annealing and/or increase the heat creep resistance of the resulting base block resin. This may make such base block copolymer resins particularly advantageous for use in tensile member 140 for high-heat (i.e., temperatures of 140° F. or greater) applications. Additionally, additives such as siloxane, polytetrafluoroethylene (PTFE), fluorocarbons derived from Teflon™, and other fluorine-based resins can be added to the base block copolymer before it is molded, to alter its tackiness and other friction-related properties.

In some embodiments, the tensile member 140 may be composed of a modified block copolymer. The tensile member 140 may be composed of modified block copolymer that is a radiation crosslinked block copolymer. In a particular embodiment, the tensile member 140 may be composed of a modified block copolymer that is an ether/ester base block copolymer that has been radiation crosslinked. The tensile member 140 may be composed of a modified block copolymer resin that is a base block copolymer resin including a base block copolymer and at least one additive, with the base block copolymer resin having been radiation crosslinked. For example, the tensile member 140 may be composed of a modified block copolymer resin that is a base block copolymer resin including an ether/ester base block copolymer, neat ether polymer, and siloxane/TPFE, with the base block copolymer resin having been radiation crosslinked.

The modified block copolymer of the tensile member 140 may have a yield strength from about 5 MPa to about 15 MPa, or from about 6 MPa to about 12 MPa, or from about 7 MPa to about 9 MPa, or about 8 MPa, as measured according to ASTM D638. The modified block copolymer of the tensile member 140 may have a percent-elongation-to-break from about 100% to about 2000%, or from about 200% to about 1800%, or from about 300% to about 1500%, or from about 400% to about 1200%, as measured according to ASTM D638. The modified block copolymer of the tensile member 140 may have an percent-elongation-to-break of at least 200% when measure at −40° C., or of at least 300% when measure at −40° C., or of at least 400% when measure at −40° C. The modified block copolymer of the tensile member 140 may also exhibit good creep resistance when at 85° C. under continuous load. A modified block copolymer exhibiting good creep resistance may display less than 30% performance loss after 200 hours of 140° F. exposure while under 100% peak loading.

A tensile member composed of a modified block copolymer may have numerous advantages over tensile members composed of other materials, especially metallic materials, including the ability to provide high amounts of torsion resistance while maintaining a low mass, and the ability to generate large amounts of friction between itself and other components of the dampener (such as the compression limiter and/or disks). Additionally, a tensile member composed of a modified block copolymer may be suitable for use in high-heat situations (i.e., at temperatures in excess of 140° F.). Without wishing to be limited by any particular theory, the chemical structure of modified block copolymers may allow modified block copolymers to avoid becoming overly-oriented in high-heat situations, and thus may allow modified block copolymers to avoid undesirable annealing under such high-heat conditions. Additionally, a tensile member made of modified block copolymer may be less costly to produce and manufacture. These advantages may allow a dampener with a tensile member composed of a modified block copolymer to be smaller, lighter, more versatile, less conspicuous, and less expensive, while also being capable of providing greater torque resistance, which may make the dampener particularly suitable for certain applications.

The tensile member may be connected to the first disk and second disk in any suitable manner. For example, the tensile member may be mechanically fastened or adhered to the disks. In an embodiment, the tensile member(s) and the disks form a single, integral piece composed of a single material. For example, the tensile member(s) and the disks may be simultaneously overmolded onto the compression limiter via a 2-Shot Injection Molding process. In one embodiment, the tensile member(s) and the disks form a single, integral piece and both the tensile members and the disks are composed of a modified block copolymer.

Returning to FIGS. 1A-1C, the dampener 100 may be twisted about its axis, the axis being in the axial direction of the compression limiter 110. In an embodiment, the force that causes the dampener 100 to twist about its axis may be generated by a separate torsion spring, with which the dampener 100 has been combined. When the dampener 100 is twisted, the tensile members 140 are loaded and they elongate, wrapping around the compression limiter 110, as shown in FIGS. 1B and 1C. As the tensile member 140 wraps around the compression limiter 110, the tensile member 140 defines an angle relative to the plane defined by the first disk 120. The tensile member 140 may be configured and positioned such that the angle defined by the tensile member 140 and the first disk 120 has any value less than 90°. For example, the angle defined by the tensile member 140 and the first disk 120 may have a value from greater than 0° to less than 90°, or from 10° to 80°, or from 20° to 70°, or from 30° to 60. In an embodiment, the angle defined by the tensile member 140 and the first disk 120 may have a value of about 45°. Additionally, as the tensile member 140 continues to wrap around the compression limiter 110 the angle defined by the tensile member 140 and the first disk 120 may continually change. Specifically, the angle defined by the tensile member 140 and the first disk 120 may continually be reduced (towards an angle approaching 0°) as the tensile member 140 continues to wrap around the compression limiter 110. When the dampener 110 is twisted, the tensile members 140 also exert a compressive force on the first disk 120 and the second disk 130, pulling the disks toward each other, which also pulls the first disk 120 toward the first end 112 of the compression limiter 110 and the second disk 130 toward the second end 114 of the compression limiter 110. In some embodiments, this compressive force may generate significant friction between ends of the compression limiter and the disks, which can dissipate energy and reduce rotational velocity.

In an embodiment, portions of the compression limiter 110, the first disk 120, the second disk 130, and the tensile members 140 contact each other and generate friction. The friction between the compression limiter 110 and the tensile members 140 act to slow the rotary motion provided by the dampener 100, as well as any torsion spring with which it is combined. Additional friction can be added to further control the rotational velocity of the torsion spring return. This friction/interference can be controlled in part by the design and composition of the tensile member, the disks, and the compression limiter. The tensile members 140 also offer tensile resistance that is translated into a rotary motion resistance or torsion moment acting as a torsion spring. In many applications a rotational dampening function is needed to remedy a slapping or violent high speed movement of the torsion spring, such as a torsion spring deployed in an automotive seat or closure door.

Friction that dampens rotational speed can be supplied in two ways. One is in the axial direction, on the axial faces of the compression limiter. The other acts on the radial surface of the compression limiter. There are numerous factors that can be controlled or varied to effect the amount of friction that dampens the rotational speed of the dampener and any rotational spring with which it may be combined.

Characteristics such as the size, shape, design and spacing of the components of a dampener can affect the amount of friction generated. For example, the diameter of the disks relative to the compression limiter and presence or absence of features that increase the surface area of the disks/axial faces of the compression limiter (such as undulations, grooves, or corrugations) also affect the amount of friction generated. Similarly, the cross sectional area of the tensile member is relevant as larger tensile member widths will increase the contact area between the tensile member and the compression limiter, thus increasing friction. Additionally, the polish or surface condition of the molded cavity used to form the compression limiter or tensile member molding, and thus the smoothness of these components, affects the amount of friction generated. The material/resin selected for the compression limiter also affects friction. Moreover, the length of the compression limiter can affect friction, with a longer compression limiter generating more friction. The radial spacing of tensile members, which can loosen or increase interference with the compression limiter, also affects how much friction is generated.

Additionally, the structure, composition, and properties of the modified block copolymer and any resin in which it is included also affect the amount of friction generated. For example, the durometer of the modified block copolymer used in the tensile members, especially with regards to the hard block/soft block ratio, affects the amount of friction generated. The more soft block present in the modified block copolymer, the tackier the polymer will be and thus the more friction that will be generated. Further, the final composition of the resin comprising the modified block copolymer, including the presence or absence of friction-altering additives like siloxane, polytetrafluoroethylene, flourocarbons that are derivatives of Teflon™, and/or other fluorine-based resins, affects how much friction is generated. Relatedly, the material Friction Factor between the block copolymer resin of the tensile member and the material used in the compression limiter affects the amount of friction generated, which increases the device torque output. Also, the percentage of orientation of the resin used in the tensile members effects the modulus of elasticity of the tensile members and thus also the amount of friction generated. Notably, the dampening effect of the modified block copolymer resin refers to the elongation stress and un-stressing of the tensile members composed of the modified block copolymer and the rate of return to home position of the tensile members; this can be controlled by adding polyethylene terephthalate (PET), which increases the hard block ratio of the block copolymer resin and thereby effects resin dampening. The orientation of the stress strain curve for the modified block copolymer is also important, in that a curved-shape stress strain curve facilitates energy dissipation.

The amount of linear spring load in the axial direction on the compression limiter, the number of preloaded rotational turns at the dampener home position, the torque in relation to rotational turns at the dampener home position, and the return speed of the stressed block copolymer resin also affect the amount of friction generated.

With reference to the block copolymer composition, increasing the hard block ratio reduces elongation, and increases yield point, which increases the rotational stiffness of the dampener. Increasing the hard block ratio also changes the friction factor between the tensile member and the compression limiter, and the wear characteristics between the components. Importantly, a harder resin will reduce the friction between the compression limiter and tensile members, reducing the dampening effect which increases the velocity. Increasing the soft block ratio has the opposite effect. Notably, the hard/soft block ratio can be master batched at the injection molding press with introduction of neat polyethylene terephthalate resin to increase the hard block content of the final block copolymer used in the tensile members.

In addition to friction, the block copolymer can act as dampening media via plastic deformation energy loss. Energy can be dampened through the energy lost from loading and unloading the tensile members, composed of modified block copolymer.

Advantageously, the dampeners with tensile members composed of modified block copolymer can be used in combination with tension springs having a wide range of torque. Typical silicon dampeners may offer only up to 70 Ncm of resistance torque, and high torque dampeners may offer up to 2000 Ncm of resistance. However, dampeners of the present disclosure, having tensile members composed of modified block copolymer, can offer high torque resistance values, for examples from 2000 Ncm to 10000 Ncm. Importantly, dampeners of the present disclosure offer this high torque resistance while also maintaining a low weight/mass and small volume, as a result of their use of modified block copolymer and exclusion of heavy metallic components. For example, a dampener of the present disclosure may advantageously be devoid of metal. Additionally, a dampener of the present disclosure may advantageously be devoid of fluid, such as silicon fluid. Typically, metallic and silicon fluid components increase the weight/mass and volume of dampeners. Dampeners with high torque resistance in combination with low mass and low volume are uniquely well suited for a number of applications, including use in automotive seats, doors, and tailgates.

Figure 2A:
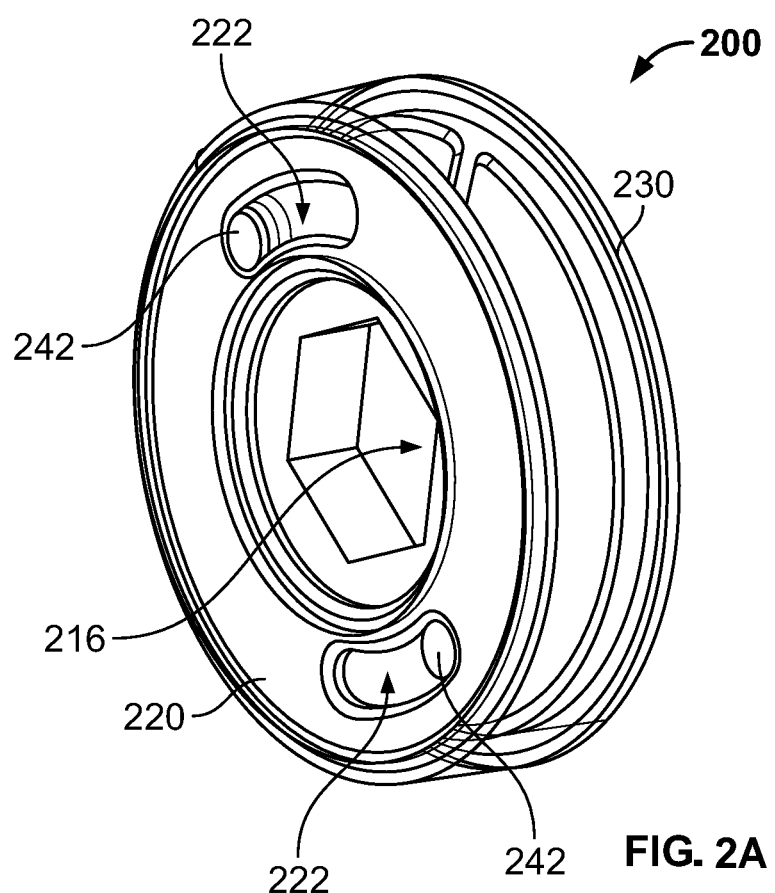
FIGS. 2A-2D show an isometric view an embodiment of a dampener, with FIG. 2A showing an isometric side view of the dampener standing alone, FIG. 2B showing an isometric bottom view of the dampener positioned between unassmebled parts of an assembly, FIG. 2C showing an isometric top view of the dampener positioned between unassmebled parts of the assembly, and FIG. 2D showing an isometric top view of the dampener positioned within the assembly once assembled.

Now referencing FIGS. 2A-2D, an embodiment similar to the dampener of FIGS. 1A-1C is shown. Referring first to FIG. 2A, a dampener 200 has a compression limiter 210. The dampener 200 also has a first disk 220 and a second disk 230, disposed at a first end and second end of the compression limiter, respectively, as well as a tensile member (not visible from this angle). The tensile member of the dampener 200 is substantially the same as the tensile member of the dampener 100, shown in FIGS. 1A-1C. Specifically, the tensile member of the dampener 200 is connected to the first disk 220 and the second disk 230. Similar to the tensile member 140 of the dampener 100, the tensile member of the dampener 200 is configured such that it may wrap around the compression limiter when the dampener 200 is twisted about is longitudinal axis. In this way, the tensile member of the dampener 200 provides substantially the same benefits to the dampener 200 as the tensile member 140 provides to the dampener 100. The dampener 200 has a hole 216, which is hexagonal in shape. This hole 216 is configured to accept a bolt, which may be used to mount the dampener 200 onto an application, such as an automobile seat. The hole 216 may be rotated by the application as the application acts/moves. For example, the hole 216 may be rotated by an automobile seat as the seat hingedly folds/unfolds. In another embodiment, the hole 216 may be a different shape.

Figure 2B:
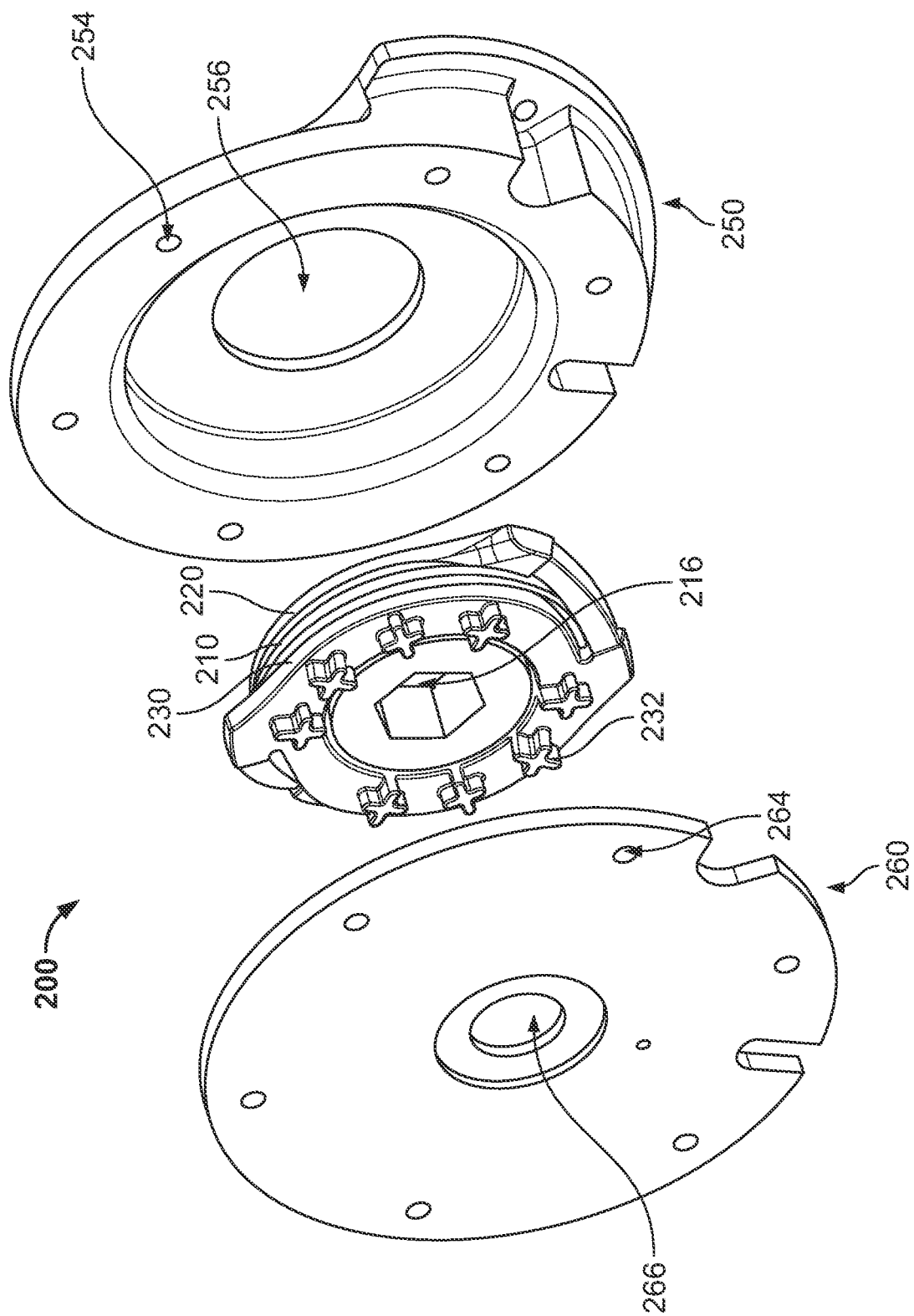

Referring next to FIG. 2B, the dampener 200 is shown, from a bottom view, positioned as part of an assembly. Specifically, the dampener 200 is positioned between a cap 250 and a base plate 260. Collectively, the dampener 200, the cap 250, and the base plate 260 form the assembly. The cap 250 has a cap opening 256 disposed approximately in the center of the cap 250 and through which a portion of the first disk 220 and entirety of the hole 216 of the dampener 200 are visible and accessible. The cap opening 256 is shown in FIG. 2B as being circular. However, the cap opening 256 may alternatively form any suitable shape, include but not limited to, an ellipse, a square, a rectangle, a hexagon, or an octagon. The cap 250 also has a plurality of peripheral cap openings 254 disposed circumferentially around the periphery of the cap 250. The base plate 260 has a base plate opening 266 disposed approximately in the center of the base plate 260 and through which at least a portion of the hole 216 of the dampener 200 is visible/accessible. At least a portion of the opening 216 can be simultaneous aligned with both the cap opening 256 and the base plate opening 266, such that an object (such as a bolt) can extend through each of the opening 216, the cap opening 256, and the base plate opening 266 simultaneously. The base plate 260 also has a plurality of peripheral base plate openings 264 disposed circumferentially around the periphery of the base plate 260. The peripheral cap openings 254 can be aligned with the peripheral base plate openings 264, so that objects (such as screws) can extend simultaneously through each pair of peripheral a cap opening 254 and a peripheral base plate opening 264, so that the cap 250 may thereby be secured to the base plate 260. The cap 250 and/or the base plate 260 are shaped such that the entirety of the dampener 200 may be enclosed between the cap 250 and the base plate 260 when the cap 250 is secured to the base plate 260 via the pairs of peripheral cap opening 254 and peripheral base plate opening 264 (i.e. when the assembly is in an assembled state). For example, in the embodiment shown in FIGS. 2B-2D, the cap 250 has a cavity in which the entirety of the dampener 200 may be enclosed when the assembly is in an assembled state.

Additionally, the dampener 200 has a plurality of securing members 232 disposed on the bottom surface of the second disk 230. The securing members 232 protrude away from the bottom surface of the second disk 230. In the embodiment shown in FIG. 2B, the securing members 232 are substantially T-shaped or cross-shaped. In other embodiments, the securing members 232 could have any suitable shape, including square, rectangular, hexagonal, or octagonal.

Figure 2C:
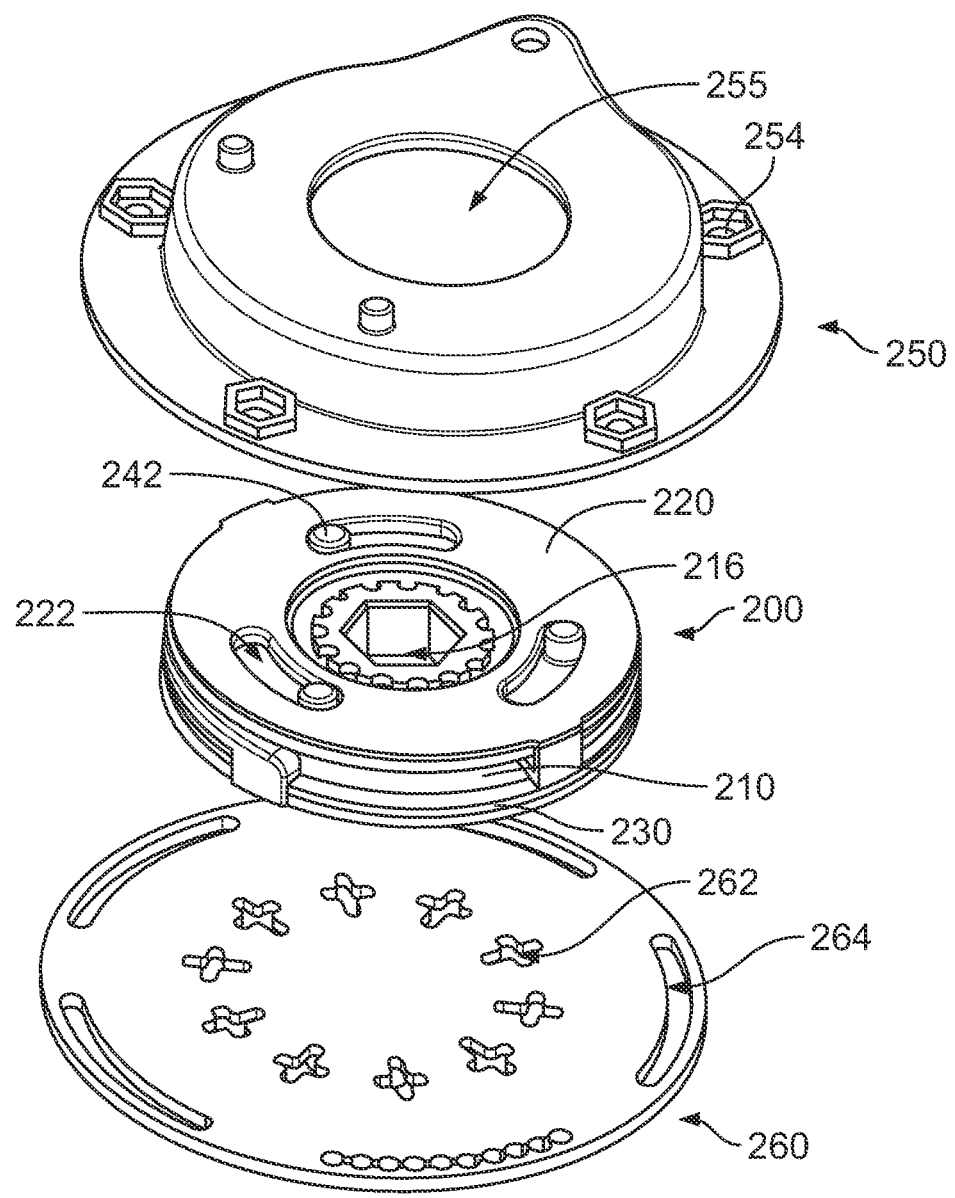

Referring now to FIG. 2C, the assembly from FIG. 2B is shown from a top view. Notably, a plurality of securing openings 262 are visibly disposed on the top surface of the base plate 260. The securing openings 262 have substantially the same shape and size as the securing members 232. The securing openings 262 may extend through the entire thickness of the base plate 260 and thereby form a plurality of holes in base plate 260. Alternatively, securing openings 262 may extend through only part of the thickness of the base plate 260 and thereby form a plurality of indentations/depressions in base plate 260. The securing openings 262 can be aligned with the securing members 232, such that the securing members 232 may be positioned within the securing openings 262.

Figure 2D:
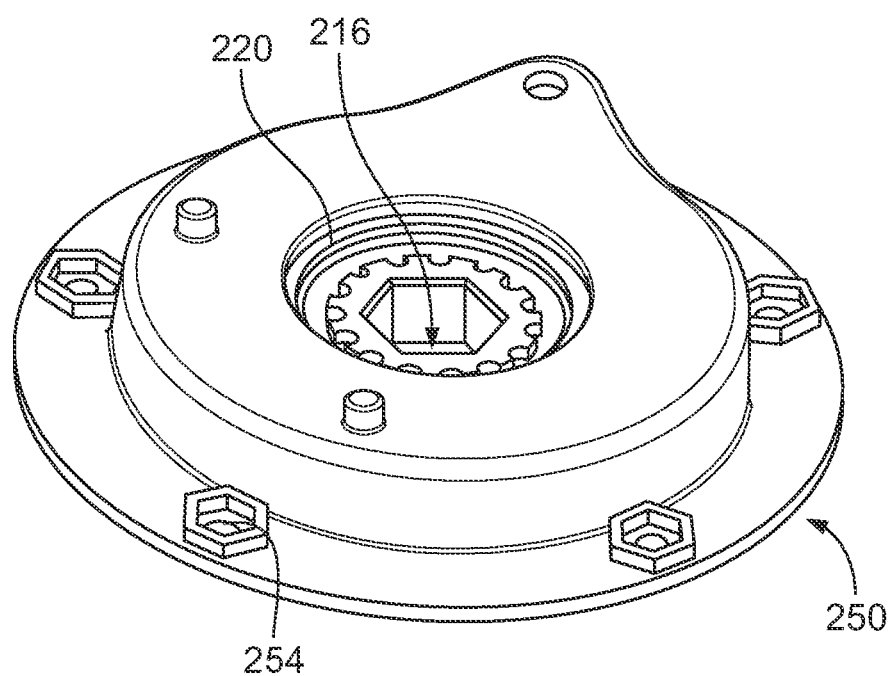

Referring to FIG. 2D, the assembly (i.e. the dampener 200, the cap 250, and the base plate 260) are shown in an assembled state. The securing members 232 of the dampener 200 are positioned within the securing openings 262 of the base plate 260, and the second disk 230 of the dampener 200 is thereby secured/held in a fixed position by the base plate 260 (i.e. the second disk 230 is prevented from rotating as the dampener 200 is twisted). As such, at least a portion of the first disk 220 and/or the compression limiter 210, may move relative to the second disk 230 when the dampener 200 is driven (i.e. twisted about its longitudinal axis) by an application, such as an automobile seat. This motion stretches the tensile member and causes the tensile member to contact and wrap around the compression limiter 210, which facilitates at least a portion of the dampening effect of the dampener 200.

Referring again to FIGS. 2A and 2C, the first disk 220 has slots 222 and the compression limiter 210 has posts 242. As shown in FIG. 2A, the compression limiter 210 includes posts 242 that are disposed so that they pair with and pass through the first disk's slots 222. When the dampener 200 is twisted about its axis such that the posts 242 travel along the slots 222, the dampener 200 is not loaded until it has been twisted sufficiently to cause the posts 242 to encounter the opposite end of the slots 222 (i.e., the first object/barrier encountered by the posts 242 is the edge of the slots 222). This unloaded portion of twisting by the dampener 200 is referred to herein as "free run." During free run the rotational speed of the dampener 200 and any torsion spring with which it may be combined are undampened. Once the dampener 200 has been sufficiently twisted such that the posts 242 encounter the ends of the slots 222, any further twisting of the dampener 200 begins to load the dampener in a similar manner as described above, in reference to FIGS. 1A-1C. The length of the free run can be modulated by varying the length of the slots 222, with a longer slot length allowing a greater amount of free run. Additionally, an embodiment dampener may have any number of pairs of posts 242 and slots 222. This is demonstrated by dampener 200, as dampener 200 is shown in FIG. 2A as having two pairs of posts 242 and slots 222, while dampener 200 is shown in FIG. 2C as having 2C as having three pairs of posts 242 and slots 222, both of which are valid configurations for dampener 200. It is also contemplated that an embodiment dampener may have any number of pairs of posts 242 and slots 222, such as 1 pair, or 4 pairs, or 5 pairs, or more. Advantageously, this gives the dampener the ability to allow a torsion spring to have free run for a certain length of motion before engaging a dampening effect on the torsion spring's movement.

Briefly referring to FIGS. 7A-7C, another embodiment dampener having a free run configuration (similar to that of dampener 200 shown in FIG. 2) is shown. Specifically, FIG. 7B shows a dampener 700 in a neutral position, FIG. 7A shows the dampener 700 as it is rotated counterclockwise from the neutral position (represented by Arrow A), and FIG. 7C shows the dampener 700 as it is rotated clockwise from the neutral position (represented by Arrow B). The dampener 700 has a compression limiter 710, a first disk 720 disposed at a first end of the compression limiter, a second disk (not shown) disposed at a second end of the compression limiter 710, a tensile member 740, and a mounting hole 716. The dampener 700 also has brakes 750, which are connected to the tensile member 740, and are positioned adjacent to, and may be in contact with, the exterior surface of the compression limiter 710.

FIG. 7B shows that when the dampener 700 is in a neutral position (i.e., not rotated either clockwise or counterclockwise), the tensile member 740 is slack (i.e., not stretched), and thus the tensile member 740 does not apply any significant force to the brakes 750.

FIG. 7A shows that as the dampener 700 is rotated counterclockwise about its longitudinal axis, represented by Arrow A, the tensile member 740 becomes stretched and applies force to the brakes 750. The force applied by the tensile member 740 to the brakes 750 increases the contact between the brakes 750 and the exterior surface of the compression limiter 710, which subsequently transfers at least a portion of said force to the compression limiter 710, at least partially in the form of friction. However, the dampener 700 is configured to delay the generation of this force, meaning that the tensile member 740 does not apply a force to brakes 750 that brings the brakes 750 into increased contact with the exterior surface of the compression limiter 710 until the dampener 700 has been rotated a sufficient distance in the counterclockwise direction. The distance that the dampener 700 must be rotated before the tensile member 740 becomes sufficiently stretched to apply a force to the brakes 750 that brings the brakes 750 into increased contact with the exterior surface of the compression limiter 710 can be referred to as the "free run" portion of the dampener 700. Once the dampener 700 has been rotated a sufficient distance, in the counterclockwise direction, such that the tensile member 740 becomes sufficiently stretched to apply a force to the brakes 750 that brings the brakes 750 into increased contact with the exterior surface of the compression limiter 710, the "free run" motion ends and the dampening effect of the dampener 700 begins.

Importantly, as the dampener 700 is rotated even farther past the end of the "free run" portion, in a counterclockwise direction, the force applied by the tensile member 740 to the brakes 750 continues to further increase, and subsequently the force applied by the brakes 750 to compression limiter 710 also further increases. This application of force further increases the dampening effect of the dampener 700. In this way, the dampener 700 is not a "binary dampener" (i.e., a dampener having only a single neutral state and a single dampening state), but rather the dampener 700 may provide a large range of dampening effects, depending on how far the dampener 700 is rotated in the counterclockwise direction.

Conversely, FIG. 7C shows that as the dampener 700 is rotated clockwise about its longitudinal axis, represented by Arrow B, the tensile member 740 stretches and applies force to the brakes 750. However, in this direction, the force applied by the tensile member 740 to the brake 750 does not increase the contact between the brakes 750 and the exterior surface of the compression limiter 710. As such, there is no increase in the force transmitted from the brakes 750 to the compression limiter 710. Therefore, when the compression limiter 700 is rotated in the clockwise direction, the dampening effect of the dampener 700 is not increased. In fact, when the dampener 700 is rotated in this direction, the brakes 750 apply nearly zero force to the exterior surface of the compression limiter 710. As such, rotation of the dampener 700 in the clockwise direction may be referred to as either "free run" or "one-directional," with respect to rotation of the dampener 700 in the clockwise direction.

Now referencing FIG. 3, the dampener 300 has a tensile member 340 that forms triangular trusses 342 and is connected to a rotor 310. As the rotor 310 spins, cams stretch the trusses 342, loading the tensile member 340. The trusses 342 unload on the back-end, which results in an energy loss and damping effect, at least in part because the stress strain curve of the modified block copolymer (from which the tensile member 340 and trusses 342 are formed) is curved.

Referencing FIG. 4, the stress strain curve of the modified block copolymer is shown. Because the stress strain modulus portion of the curve is actually curve-shaped (not straight), the modified copolymer dissipates energy via plastic deformation. This dissipated energy is represented by the colored area between the curves. Thus, the dampener can be designed to utilize the slow slope (low modulus) portion of the curve, or the steep (high modulus) portion of the curve. The result will be different spring rates per orientation amount.

The stress strain curve of FIG. 4 illustrates how the stress strain curve in the loading direction is not the same as the unloading direction, which may be exemplified in the dampener shown in FIG. 3. Therefore, the total work (W=FD) to unload the tensile member is less than the work to load the tensile member. The difference in work from plastic deformation results in energy loss or dampening of kinetic energy. Further, the normal force from the tensile member on the rotor, which may be a rotational spring, causes a frictional force which adds to the overall dampening rate.

Referring again to FIG. 3, the dampener shown uses the same principles employed in the dampener of FIGS. 1-2. In this embodiment, the tensile member 340 is formed into triangular trusses 342. The triangular trusses 342 are in tension or compression depending on the configuration of the dampener 300. The compression limiter (or rotor) can be hollow, accepting the tensioned triangular trusses 342. Alternatively, the compression limiter can be solid, compressing the trusses 342. The triangle trusses 342 are stressed by interference with the compression limiter or rotor, creating friction. If the compression limiter (or rotor) is irregularly shaped (non-circular) then a CAM'ed compression limiter will be formed and will variably stress the trusses 342 when turning. The trusses 342 can recede when combined with a compression limiter having dimples to form a detent function when turned. Furthermore, the triangular legs of a truss can be design with non-parallel compression/tensile-resistance, making the triangular truss unbalanced. If one leg is weaker that the other, the compression limiter can rotate in one direction with lower friction than in the opposite direction. This is important when a free-run rotational dampener is desired.

Now referencing FIG. 5, a top schematic view of an embodiment dampener 500 installed on an application 550 by a bolt 560 is shown. The dampener 500 is similar to the dampener shown in FIGS. 1A-1C, having a compression limiter 510, a first disk 520, a second disk 530, and a tensile member (not shown). The application includes a clockspring 570, to which the dampener 500 is combined, via the bolt 560.

Figure 6A:
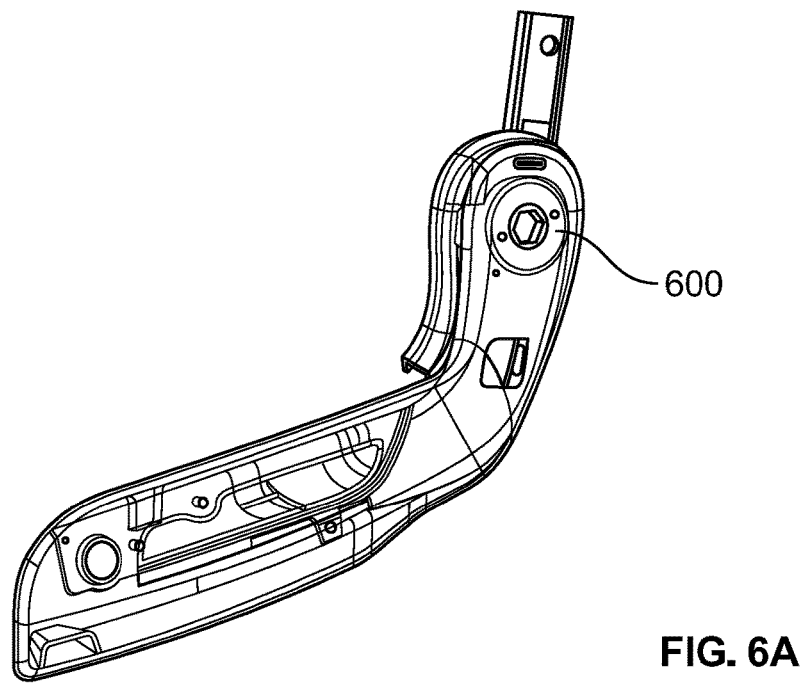
FIG. 6A is a side view of an automotive seat side shield in which one embodiment of a dampener is deployed.
Figure 6B:
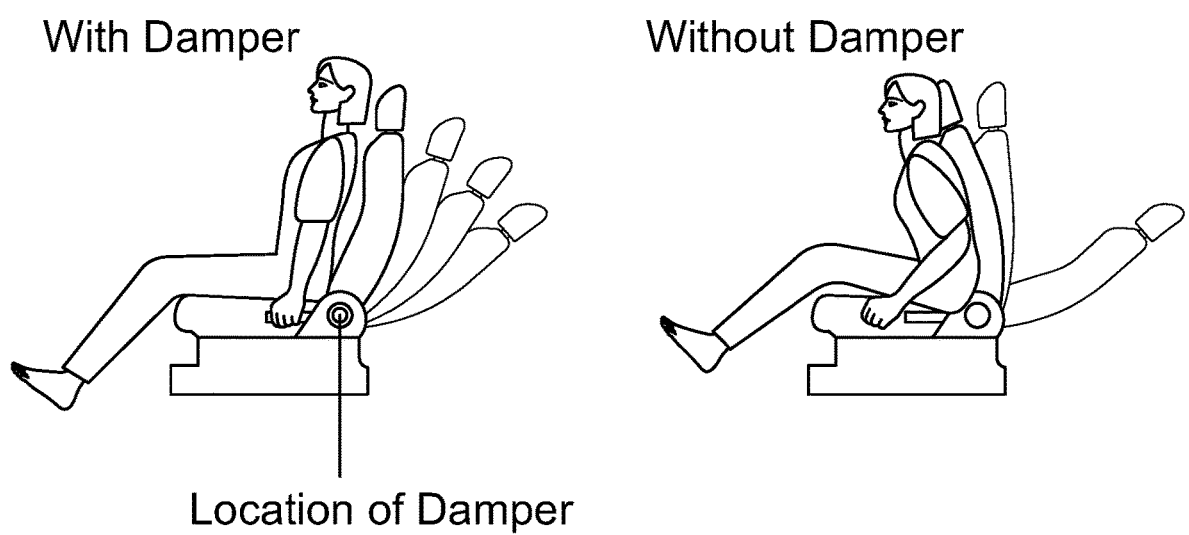
FIG. 6B shows the rotational spring-driven motion of an automotive seat both with and without a rotational spring dampener.
Figure 7A:
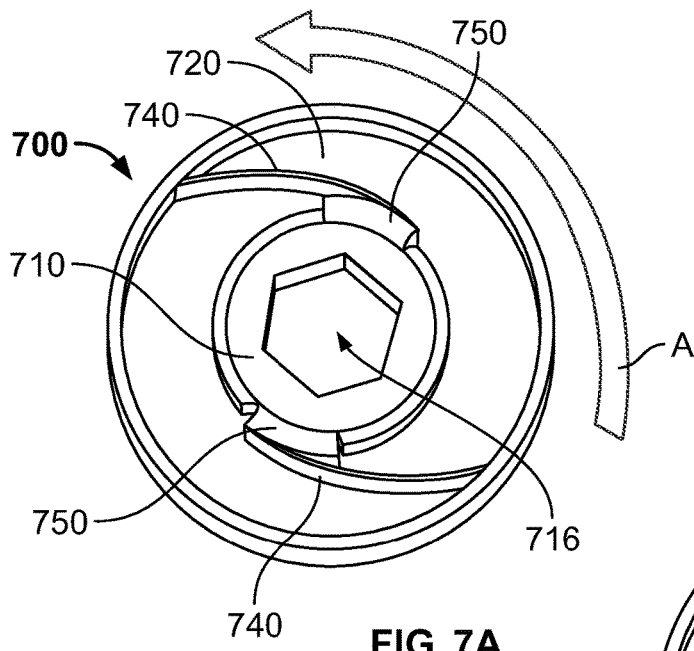
FIGS. 7A-7C show an internal side view of another embodiment dampener, with FIG. 7B showing the dampener in a neutral position, FIG. 7A showing the dampener in a counterclockwise-rotated position, and FIG. 7C showing the dampener in a clockwise-rotated position.
Figure 7B:
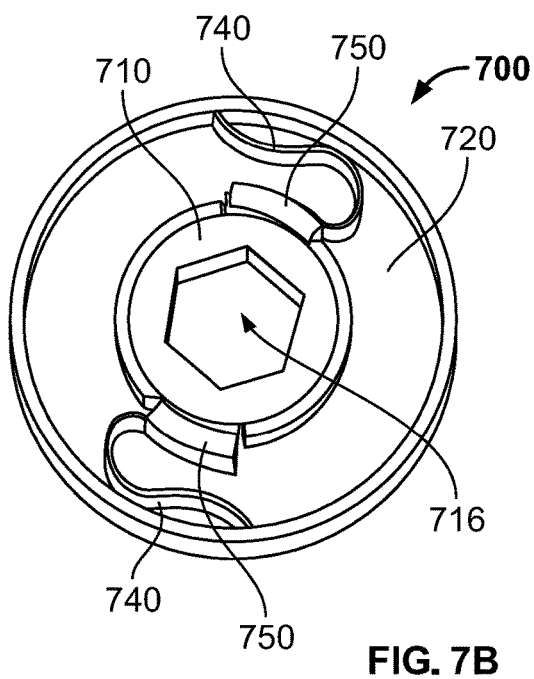
Figure 7C:
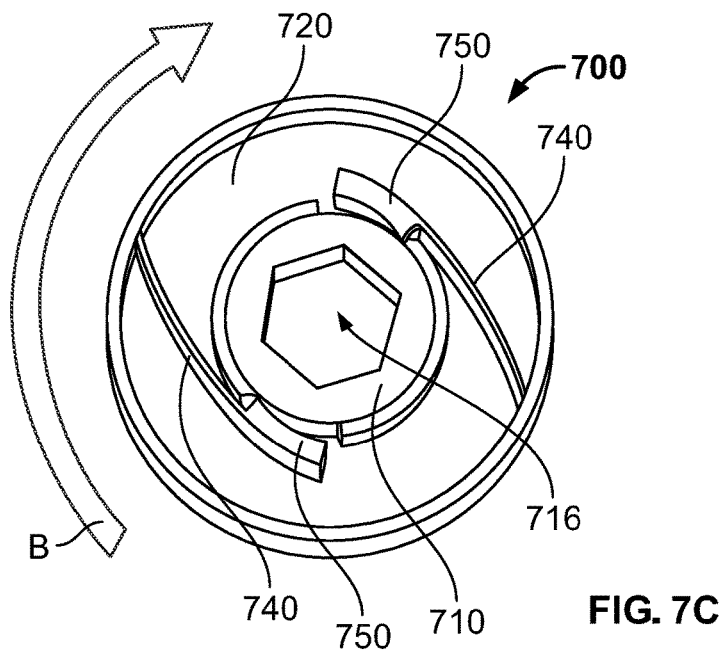

FIG. 6A shows a side shield for an automotive seat. An embodiment dampener 600 is deployed in the side shield. The dampener 600 may be used to slow the movement speed of automotive seat, where the automotive seat's movement is driven by a rotational spring. FIG. 6B shows the movement of an automotive seat both with and without a tension spring dampener. FIG. 6B illustrates that a tension spring dampener of the present disclosure can slow the rotational movement speed of the automotive seat, beneficially creating a safer, smoother, and more luxurious feeling movement.

In an embodiment, a dampener comprises a compression limiter, a first disk, a second disk, and a tensile member that do not contact each other substantially more (and thus do not generate substantially more friction) when the dampener is in a twisted/loaded state (similar to that shown by FIGS. 1B-1C) than when the dampener is in its home-state (similar to that shown by FIG. 1A). In such an embodiment, the dampener actually functions as an undampened torsional spring, rather than as a dampener for a torsional spring.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

The invention claimed is:

1. A rotational spring dampener, comprising:
   a compression limiter having an exterior surface and a mounting hole that is configured to receive a fastener;
   a first disk disposed at a first end of the compression limiter, wherein the first disk is disposed around and in contact with the exterior surface of the compression limiter;
   a second disk disposed at a second end of the compression limiter, the second end opposite the first end;
   a tensile member connected to the first disk and the second disk; and
   a brake connected to the tensile member and positioned adjacent to the compression limiter,
   wherein the tensile member is configured to adjust contact between the brake and the exterior surface of the compression limiter, and
   wherein the tensile member comprises a block copolymer.

2. The rotational spring dampener of claim 1, wherein the brake and the tensile member are configured to apply a friction force to the compression limiter when the rotational spring dampener is rotated about its longitudinal axis.

3. The rotational spring dampener of claim 1, wherein the brake is in contact with and applies a force to the compression limiter.

4. The rotational spring dampener of claim 1, wherein the block copolymer is a modified block copolymer that is a radiation crosslinked block copolymer.

5. The rotational spring dampener of claim 4, wherein the modified block copolymer has a yield strength from about 5 MPa to about 15 MPa, as measured according to ASTM D638.

6. The rotational spring dampener of claim 1, wherein the rotational spring dampener has a torque resistance from 2,000 Ncm to 10,000 Ncm.

7. The rotational spring dampener of claim 1, wherein the tensile member is in contact with the compression limiter.

8. The rotational spring dampener of claim 1, wherein, when the spring dampener is rotated counterclockwise a first distance, the tensile member is configured to stretch to increase the contact between the brake and the exterior surface of the compression limiter.

9. The rotational spring dampener of claim 8, wherein, when the spring dampener is rotated clockwise a second distance, the tensile member is configured to stretch without causing increased contact between the brakes and the exterior surface of the compression limiter.

10. The rotational spring dampener of claim 9, wherein, when the spring dampener is in a neutral position, the tensile member is configured to be in a slack state.

\* \* \* \* \*